United States Patent
Vassallo et al.

(10) Patent No.: US 8,964,501 B2
(45) Date of Patent: Feb. 24, 2015

(54) SYSTEM AND TECHNIQUE TO DETERMINE HIGH ORDER DERIVATIVES FROM SEISMIC SENSOR DATA

(75) Inventors: Massimiliano Vassallo, Hove (GB); Johan Olof Anders Robertsson, Grantchester (GB); Dirk-Jan Van Manen, Reigate (GB)

(73) Assignee: WesternGeco L.L.C., Houston, TX (US)

( * ) Notice: Subject to any disclaimer, the term of this patent is extended or adjusted under 35 U.S.C. 154(b) by 1435 days.

(21) Appl. No.: 12/126,889

(22) Filed: May 25, 2008

(65) Prior Publication Data
US 2009/0290448 A1 Nov. 26, 2009

(51) Int. Cl.
*G01V 1/38* (2006.01)
*G01V 1/28* (2006.01)

(52) U.S. Cl.
CPC .............. *G01V 1/3808* (2013.01); *G01V 1/284* (2013.01)
USPC ................ 367/21; 367/20; 181/110; 181/112

(58) Field of Classification Search
CPC .............................. G01V 1/284; G01V 1/3808
USPC ............ 181/110, 112; 367/20, 21, 23, 24, 58, 367/59
See application file for complete search history.

(56) References Cited

U.S. PATENT DOCUMENTS

| | | | |
|---|---|---|---|
| 5,193,077 A * | 3/1993 | Weiglein et al. | 367/23 |
| 6,775,618 B1 | 8/2004 | Robertsson et al. | |
| 7,068,568 B2 | 6/2006 | Robertsson | |
| 7,167,413 B1 * | 1/2007 | Rouquette | 367/20 |
| 7,386,397 B2 | 6/2008 | Amundsen et al. | |
| 2003/0117894 A1 * | 6/2003 | Curtis et al. | 367/58 |
| 2006/0250890 A1 | 11/2006 | Van Den Berg et al. | |
| 2006/0291328 A1 | 12/2006 | Robertsson et al. | |
| 2007/0265785 A1 | 11/2007 | Robertsson | |

FOREIGN PATENT DOCUMENTS

| | | | | |
|---|---|---|---|---|
| GB | 2379505 A | | 3/2003 | |
| WO | WO03036331 | * | 5/2003 | ............... G01V 1/36 |
| WO | WO03100461 | * | 12/2003 | |
| WO | WO2005114258 | * | 12/2005 | ............... G01V 1/36 |
| WO | WO 2005121837 A1 | * | 12/2005 | ............... G01V 1/36 |
| WO | 2008008632 A2 | | 1/2008 | |

OTHER PUBLICATIONS

PCT Search Report, dated Jan. 13, 2010, Application No. PCT/US2009/045054.
Extended Search Report of European Patent Application Serial No. 09763221.0 dated Mar. 6, 2012: pp. 1-6.
Amundsen et al., "Rough-sea deghosting of streamer seismic data using pressure gradient approximations," Geophysics, vol. 70(1): pp. v1-v9, 2005.

\* cited by examiner

*Primary Examiner* — Daniel L Murphy (57) ABSTRACT

A technique includes obtaining multi-component seismic data acquired by two or more seismic sensors while in tow. The multi-component seismic data is indicative of a pressure wavefield and particle motion. The technique includes based on the data, determining at least one high order (i.e., second order or higher) spatial derivative of the pressure wavefield.

24 Claims, 6 Drawing Sheets

SYSTEM AND TECHNIQUE TO DETERMINE HIGH ORDER DERIVATIVES FROM SEISMIC SENSOR DATA

BACKGROUND

The invention generally relates to a system and technique to determine high order derivatives from seismic sensor data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining multi-component seismic data acquired by two or more seismic sensors while in tow. The multi-component seismic data is indicative of a pressure wavefield and particle motion. The technique includes, based on the data, determining at least one high order (i.e., second order or higher) spatial derivative of the pressure wavefield.

In another embodiment of the invention, a system includes an interface to receive multi-component seismic data, which is acquired by two or more seismic sensors while in tow. The system includes a processor to process the multi-component seismic data to determine at least one high order spatial derivative of the pressure wavefield.

Advantages and other features of the invention will become apparent from the following drawing, description and claims.

DETAILED DESCRIPTION

Figure 1:
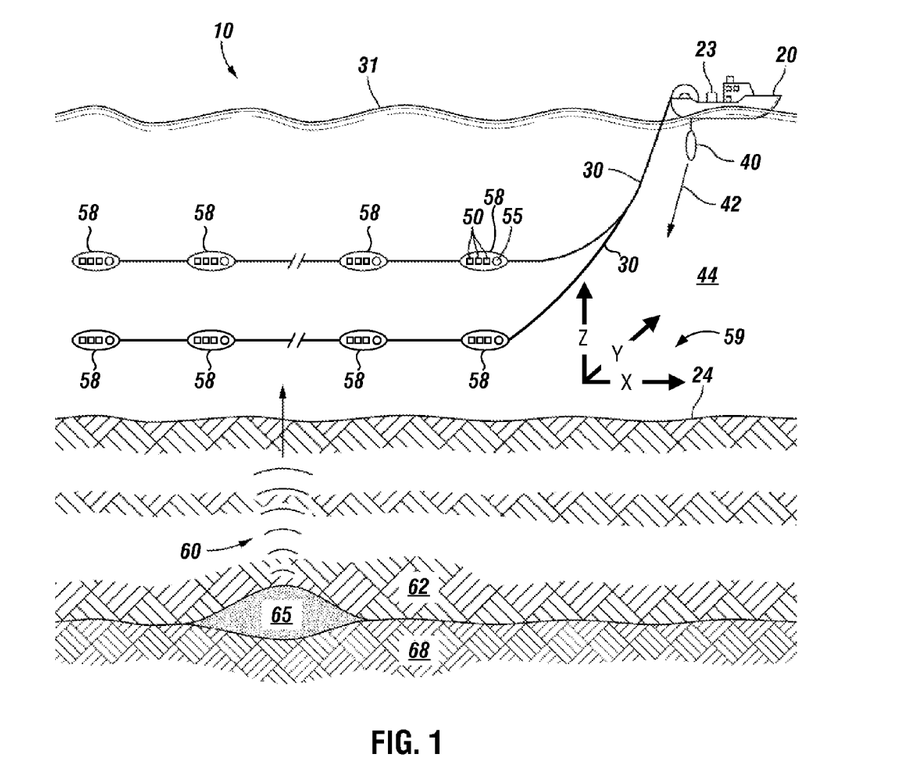
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30.

Each seismic streamer 30 contains seismic sensors, which record seismic signals. In accordance with some embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are generated by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 7:
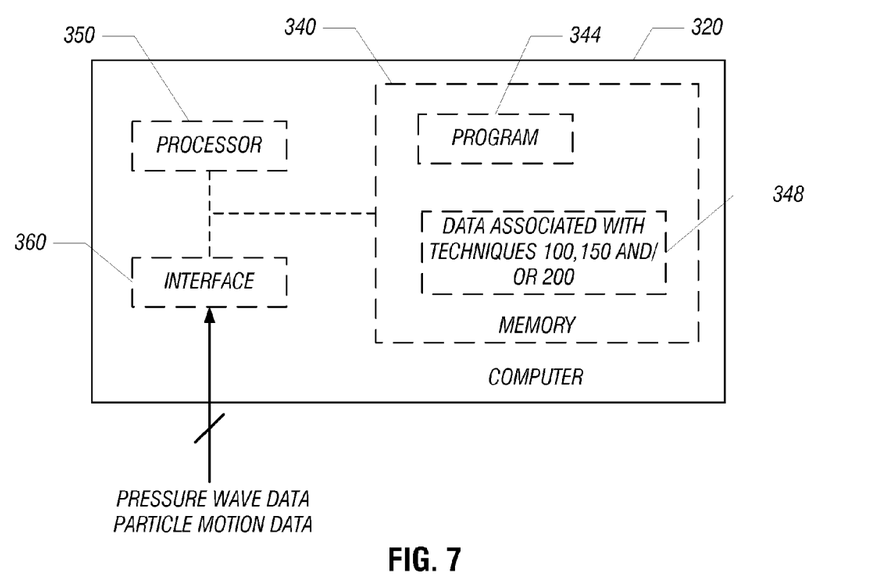
FIG. 7 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 7 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data that is provided by the multi-component seismic sensors 58 allows the recovery of "ghost" free data, which means data that is indicative of the upgoing wavefield.

In accordance with some embodiments of the invention, the multi-component seismic sensors 58 may be arranged in specific orientations that facilitate the computation of spatial derivatives of the pressure wavefield. For example, referring to FIG. 2 in conjunction with FIG. 1, in accordance with some embodiments of the invention, the multi-component seismic sensors 58 may be configured so that pairs of the sensors 58 are towed in an over/under orientation. In the over/under orientation, each pair of multi-component seismic sensors has the same crossline (y) and inline (x) position (see axes 59 of FIG. 1), but the sensors 58 of the pair have different depths (i.e., positions along the z axis). For example, the multi-component seismic sensors 58 may be located on upper and lower streamers 30, such that each seismic sensor 58 of the upper streamer 30 is directly above an associated seismic sensor 58 of the lower streamer 30.

Figure 2:
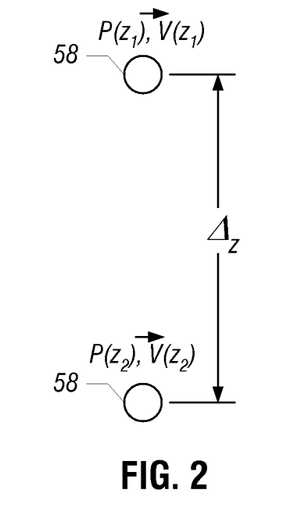
FIG. 2 illustrates an over/under orientation of multi-component seismic sensors according to an embodiment of the invention.

For the under/over orientation, the upper seismic sensor 58 of the pair acquires a pressure measurement (called "$P(z_1)$") and a particle motion measurement, such as a velocity (called "$\vec{V}(z_1)$"), at a vertical position called "$z_1$." The lower multi-component seismic sensor 58 of the pair acquires a pressure measurement (called "$P(z_2)$") and a particle motion measurement, such as a velocity (called "$\vec{V}(z_2)$"), at a vertical position called "$z_2$." The multi-component seismic sensors 58 of the under/over pair are spaced apart by the difference of the $z_1$ and $z_2$ vertical positions, or "$\Delta z$."

In general, the under/over orientation allows the calculation of vertical spatial derivatives of the pressure wavefield and may be used in, for example, three-dimensional (3-D) applications, such as deghosting applications. Techniques are described herein for purposes of determining high order (second order or higher) spatial derivatives from the under/over orientation, which improves the quality of 3-D seismic data processing applications. As also described herein, the over/under orientation also allows the calculation of high order crossline, or horizontal, spatial derivatives of the pressure wavefield.

Figure 3:
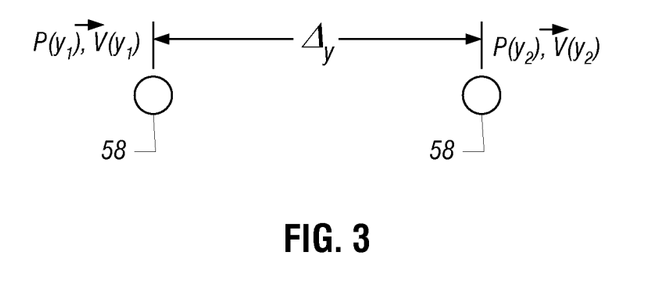
FIG. 3 illustrates a side-by-side orientation of multi-component seismic sensors according to an embodiment of the invention.

FIG. 3 depicts another sensor orientation, called a "side-by-side" orientation. In this sensor orientation, each multi-component sensor 58 has the same inline (x) and vertical (z) positions, but the sensors 58 have different crossline (y) positions, (i.e., positions along the y axis). One of the multi-component seismic sensors 58 provides pressure (called "$P(y_1)$" and velocity (called "$\vec{V}(y_1)$") measurements at a location $y_1$; and the other multi-component seismic sensor 58 provides pressure (called "$P(y_2)$") and velocity (called "$\vec{V}(y_2)$") measurements at another crossline location called "$y_2$." In this orientation, the multi-component seismic sensors 58 are spaced apart by the difference of the $y_1$ and $y_2$ positions, or "$\Delta y$." The side-by-side orientation may be achieved by, for example, towing two streamers 30 (see FIG. 1) side-by-side such that each streamer 30 contains a multi-component seismic sensor 58 of a side-by-side pair.

The side-by-side orientation allows the calculation of horizontal spatial derivatives of the pressure wavefield. These derivatives may be used for such purposes as 3-D seismic crossline interpolation. As described below, techniques are disclosed herein for purposes of using the data gathered from the side-by-side configuration to determine high order (second order or higher) spatial derivatives to improve the 3-D seismic crossline interpolation application. As also described herein, the side-by-side configuration also allows the calculation of high order vertical spatial derivatives of the pressure wavefield.

Depending on the particular embodiment of the invention, the multi-component seismic sensors 58 may be arranged on streamers 30 to achieve one or both of the above-mentioned orientations. In this regard, in accordance with some embodiments of the invention, the system 10 that is depicted in FIG. 1 may include side-by-side streamers 30 to create the side-by-side sensor orientation; and likewise, the system 10 may include over and under streamers 30 for purposes of creating the over/under sensor orientation. In other embodiments of the invention, the streamers 30 may be arranged for purposes of only creating one of the side-by-side and over/under sensor orientations. Thus, many variations are contemplated, all of which are within the scope of the appended claims.

Figure 4:
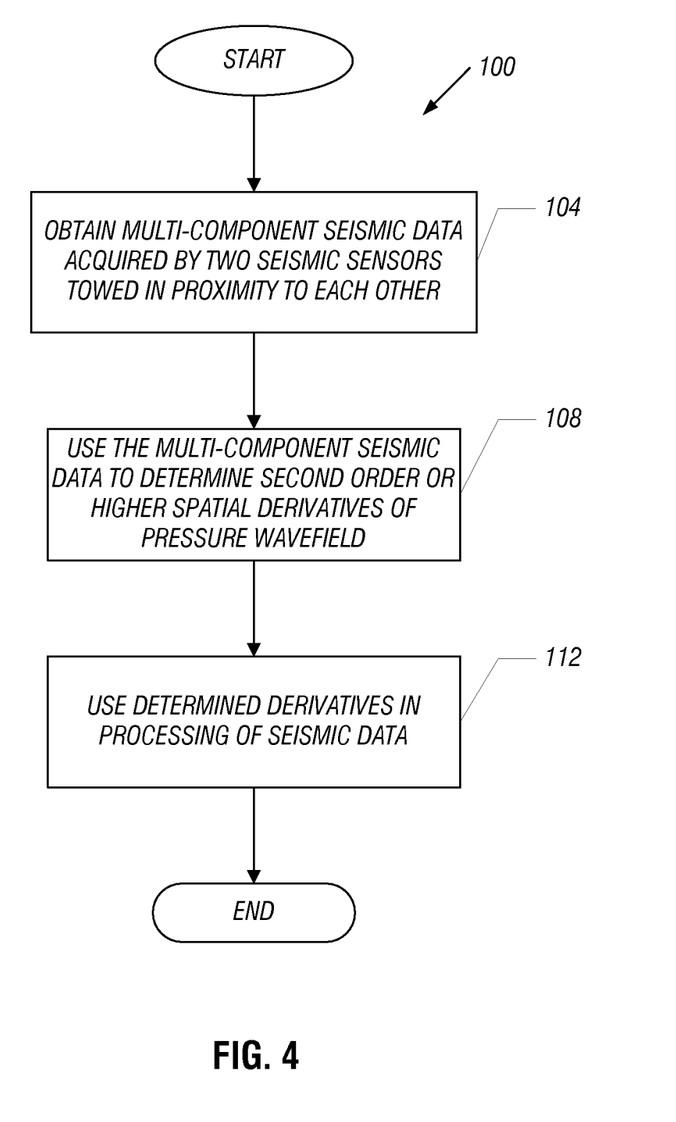
FIGS. 4, 5 and 6 are flow diagrams depicting techniques to calculate and use high order spatial derivatives of a pressure wavefield according to embodiments of the invention.

Referring to FIG. 4, to summarize, in accordance with embodiments of the invention described herein, a technique 100 includes obtaining multi-component seismic data, which is acquired by two seismic sensors that are towed in proximity to each other, pursuant to block 104. These seismic sensors may be, for example, in an under/over or side-by-side orientation. The multi-component seismic data is used (block 108) to determine second order or higher spatial derivatives of the pressure wavefield. The determined derivatives may then be used, pursuant to block 112, in the processing of the seismic data.

In general, multi-component streamers measure directly the pressure wavefield and the particle motion: the particle motion is directly linked to the first order spatial derivatives of the pressure wavefield, that can then be obtained directly from the multi-component streamers measurements. With the over/under configuration of such streamers, in particular, the vertical component of spatial pressure gradient (particle acceleration) is measured at two close depths. More specifically, the following relationship exists between pressure, horizontal pressure derivatives, and vertical particle velocity, when pressure is measured in over/under configuration at the depths $z_1$ and $z_2$:

$$v_z(\omega, k_x, k_y, z_1) = \frac{i}{\rho\omega\Delta_z}\sum_{m=0}^{\infty}(-1)^m F_m^{(1)}\kappa^{2m}P(\omega, k_x, k_y, z_1) - \frac{i}{\rho\omega\Delta_z}\sum_{m=0}^{\infty}(-1)^m F_m^{(2)}\kappa^{2m}P(\omega, k_x, k_y, z_2),$$

Eq. 1 where "$\rho$" represents the density of the water; "$\omega$" represents the frequency (rad/s); "$k_x$" and "$k_y$" are the horizontal wavenumbers (rad/m); and "$\kappa$" is defined by "$\sqrt{k_x^2+k_y^2}$."

The lowest order coefficients in the expansions that are set forth in Eq. 1 are as follows:

$$F_0^{(1)} = k\Delta z \cot(k\Delta z);$$  Eq. 2

$$F_1^{(1)} = \frac{\Delta z}{2k}\frac{d}{d(k\Delta z)}k\Delta z\cot(k\Delta z);$$  Eq. 3

$$F_0^{(2)} = \frac{k\Delta z}{\sin(k\Delta z)};$$  Eq. 4 and $$F_1^{(2)} = \frac{\Delta z}{k}\frac{\sin(k\Delta z)-k\Delta z\cos(k\Delta z)}{\sin^2(k\Delta z)}.$$  Eq. 5

In Eqs. 2-5, "k" is defined by "$\omega/c$."

From Eq. 1 it results that the first order terms of the expansions are related to the second order horizontal derivative of the pressure, due to the relationship $\kappa^2=k_x^2+k_y^2$. In practice, a marine streamer acquisition only allows to calculate, through finite difference method, the in-line (x) component of the horizontal derivative. In fact, along the streamers, sensor spacing allows the finite difference methods to guarantee very good performance. On the contrary, due to wide spacing between streamers, the crossline (y) second order derivative is unknown.

A multi-component over/under acquisition allows the estimation of the second order derivatives of the pressure wavefield by solving the system that is set forth below in Eqs. 6 and 7:

$$v_z(\omega, k_x, k_y, z_1) \cong \frac{i}{\rho\omega\Delta z}\sum_{m=0}^{1}(-1)^m F_m^{(1)}\kappa^{2m}P(\omega, k_x, k_y, z_1) - \frac{i}{\rho\omega\Delta z}\sum_{m=0}^{1}(-1)^m F_m^{(2)}\kappa^{2m}P(\omega, k_x, k_y, z_2),$$

Eq. 6 and $$v_z(\omega, k_x, k_y, z_2) \cong \frac{i}{\rho\omega\Delta z}\sum_{m=0}^{1}(-1)^m F_m^{(1)}\kappa^{2m}P(\omega, k_x, k_y, z_2) + \frac{i}{\rho\omega\Delta z}\sum_{m=0}^{1}(-1)^m F_m^{(2)}\kappa^{2m}P(\omega, k_x, k_y, z_1).$$

Eq. 7

The system that is set forth in Eqs. 6 and 7 has two unknown values, "$k_y^2 P(\omega,k_x,k_y,z_1)$" and "$k_y^2 P(\omega,k_x,k_y,z_2)$," which correspond to the crossline components of the second order spatial derivative of the pressure wavefield at the sampled positions $z_1$ and $z_2$, respectively.

Since the system set forth in Eqs. 6 and 7 only considers the first order terms of infinite expansions, there are approximations to be taken into account, where the approximation error of the estimate is proportional to the distance between the two streamers. This observation introduces the key advantage in using the over/under configuration for multi-component streamers: in this case, the streamers can be designed to be as close as desired. In fact, at the sea surface the value of pressure and pressure horizontal derivative are also known, and their value has to be zero. Such information could be taken into account in a single multi-component streamer configuration, to be applied to a system as the one shown in Eqs. 6 and 7. However, the approximation set forth in Eqs. 6 and 7, in this case gives a good estimate only if the streamer is very shallow; and a shallow streamer may not be convenient for other reasons.

In addition to the crossline components of the second order derivative at the sampled positions, the over/under orientation also allows the first, second and third order vertical derivatives of pressure at the central position between the two sampled positions. More specifically, the information measured at one streamer position may analytically be described as a function of the wavefield at the other streamer position, through the use of Taylor expansions. The Taylor expansion of pressure, P, and its vertical derivative, $P^I$, from the position of the first streamer (denoted by the "0" subscript below) to the position of the second streamer (denoted by the "1" subscript below) may be described as follows:

$$P_1 = P_0 + \Delta z P_0^I + \frac{\Delta z^2}{2}P_0^{II} + \frac{\Delta z^3}{6}P_0^{III} + \frac{\Delta z^4}{24}P_0^{IV} + o(\Delta z^5),$$  Eq. 8 and $$P_1^I = P_0^I + \Delta z P_0^{II} + \frac{\Delta z^2}{2}P_0^{III} + \frac{\Delta z^3}{6}P_0^{IV} + \frac{\Delta z^4}{24}P_0^V + o(\Delta z^5).$$  Eq. 9

Likewise, at the central position between the two streamers, indicated by the "½" subscript, the pressure and its vertical derivatives may be described as follows:

$$P_{\frac{1}{2}} = P_0 + \frac{\Delta z}{2}P_0^I + \frac{\Delta z^2}{8}P_0^{II} + \frac{\Delta z^3}{48}P_0^{III} + \frac{\Delta z^4}{384}P_0^{IV} + o(\Delta z^5),$$  Eq. 10

$$P_{\frac{1}{2}}^I = P_0^I + \frac{\Delta z}{2}P_0^{II} + \frac{\Delta z^2}{8}P_0^{III} + \frac{\Delta z^3}{48}P_0^{IV} + \frac{\Delta z^4}{384}P_0^V + o(\Delta z^5),$$  Eq. 11

$$P_{\frac{1}{2}}^{II} = P_0^{II} + \frac{\Delta z}{2}P_0^{III} + \frac{\Delta z^2}{8}P_0^{IV} + \frac{\Delta z^3}{48}P_0^V + \frac{\Delta z^4}{384}P_0^{VI} + o(\Delta z^5),$$  Eq. 12 and $$P_{\frac{1}{2}}^{III} = P_0^{III} + \frac{\Delta z}{2}P_0^{IV} + \frac{\Delta z^2}{8}P_0^V + \frac{\Delta z^3}{48}P_0^{VI} + \frac{\Delta z^4}{384}P_0^{VII} + o(\Delta z^5). \quad \text{Eq. 13}$$

If the values of $P_0$, $P_1$, $P_0^I$ and $P_1^I$ are known, through the traditional finite difference approach, it is possible to obtain the following estimates:

$$\hat{P}_{\frac{1}{2}}^I = \frac{P_1 - P_0}{\Delta z} = P_0^I + \frac{\Delta z}{2}P_0^{II} + \frac{\Delta z^2}{6}P_0^{III} + \quad \text{Eq. 14}$$
$$\frac{\Delta z^3}{24}P_0^{IV} + \frac{\Delta z^4}{8 \cdot 24}P_0^V + o(\Delta z^5) = P_{\frac{1}{2}}^I + o(\Delta z^2),$$

$$\hat{P}_{\frac{1}{2}}^{II} = \frac{P_1^I - P_0^I}{\Delta z} = P_{\frac{1}{2}}^{II} + o(\Delta z^2), \quad \text{Eq. 15}$$

and $$\tilde{P}_{\frac{1}{2}}^{III} = \frac{3}{2}\left(\frac{\Delta z}{2}\right)^{-2}\left(P_1^I + P_0^I - 2\hat{P}_{\frac{1}{2}}^I\right) = P_{\frac{1}{2}}^{III} + o(\Delta z^2). \quad \text{Eq. 16}$$

The bias factor in Eqs. 14-16 is due to the fact that the estimate of the first order derivative at the central position is used there, instead of the actual value, which is not available.

Figure 5:
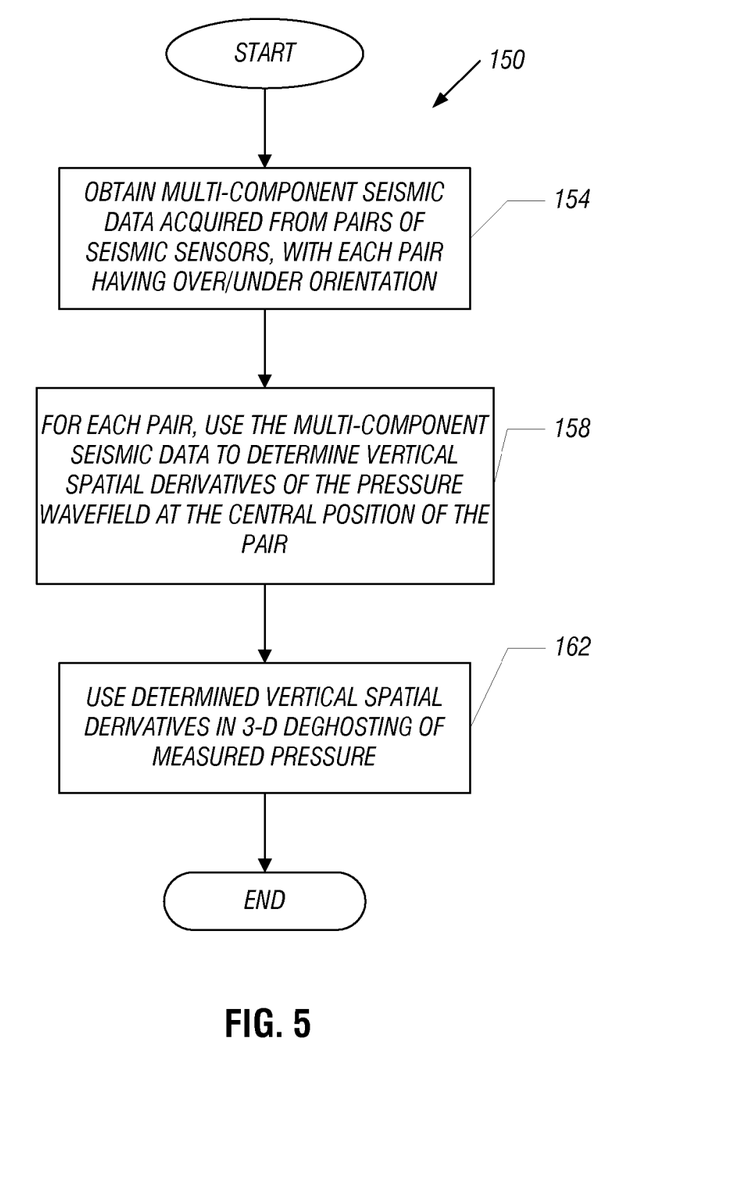

To summarize, a technique 150 that is depicted in FIG. 5 may be used in accordance with some embodiments of the invention. Referring to FIG. 5, the technique 150 includes obtaining (block 154) multi-component seismic sensor data, which is acquired from pairs of seismic sensors. Each pair has an over/under orientation. For each pair, the multi-component seismic data is used (block 158) to determine the vertical spatial derivatives of the pressure wavefield at a central position of the pair. The vertical spatial derivatives may be used (block 162) in 3-D de-ghosting of the measured pressure.

The analytical expressions used here to illustrate the calculation of derivatives for the over/under orientation may also be applied as well to calculate the derivatives for the side-by side configuration. In this case, the z-dimension and the y-dimension change their respective roles in the equations, but the results remain consistent.

More specifically, in a side-by-side sensor orientation, the second order vertical derivatives of pressure at the sampled positions may be estimated by solving the system that is set forth below in Eqs. 17 and 18:

$$v_y(\omega, k_x, k_z, y_1) \cong \frac{i}{\rho \omega \Delta y}\sum_{m=0}^{1}(-1)^m F_m^{(1)}\kappa_{xz}^{2m}P(\omega, k_x, k_z, y_1) - \quad \text{Eq. 17}$$
$$\frac{i}{\rho \omega \Delta y}\sum_{m=0}^{1}(-1)^m F_m^{(2)}\kappa_{xz}^{2m}P(\omega, k_x, k_z, y_2),$$

and $$v_y(\omega, k_x, k_z, y_2) \cong -\frac{i}{\rho \omega \Delta y}\sum_{m=0}^{1}(-1)^m F_m^{(1)}\kappa_{xz}^{2m}P(\omega, k_x, k_z, y_2) + \quad \text{Eq. 18}$$
$$\frac{i}{\rho \omega \Delta y}\sum_{m=0}^{1}(-1)^m F_m^{(2)}\kappa_{xz}^{2m}P(\omega, k_x, k_z, y_1).$$

The first, second and third order horizontal derivatives of pressure at the central position between the two streamers may be estimated as set forth below in Eqs. 19, 20 and 21:

$$\hat{P}_{\frac{1}{2}}^I = \frac{P_1 - P_0}{\Delta y} = P_0^I + \frac{\Delta y}{2}P_0^{II} + \frac{\Delta y^2}{6}P_0^{III} + \quad \text{Eq. 19}$$
$$\frac{\Delta y^3}{24}P_0^{IV} + \frac{\Delta y^4}{8 \cdot 24}P_0^V + o(\Delta y^5) = P_{\frac{1}{2}}^I + o(\Delta y^2),$$

$$\hat{P}_{\frac{1}{2}}^{II} = \frac{P_1^I - P_0^I}{\Delta y} = P_{\frac{1}{2}}^{II} + o(\Delta y^2), \quad \text{Eq. 20}$$

and $$\tilde{P}_{\frac{1}{2}}^{III} = \frac{3}{2}\left(\frac{\Delta y}{2}\right)^{-2}\left(P_1^I + P_0^I - 2\hat{P}_{\frac{1}{2}}^I\right) = P_{\frac{1}{2}}^{III} + o(\Delta y^2). \quad \text{Eq. 21}$$

Figure 6:
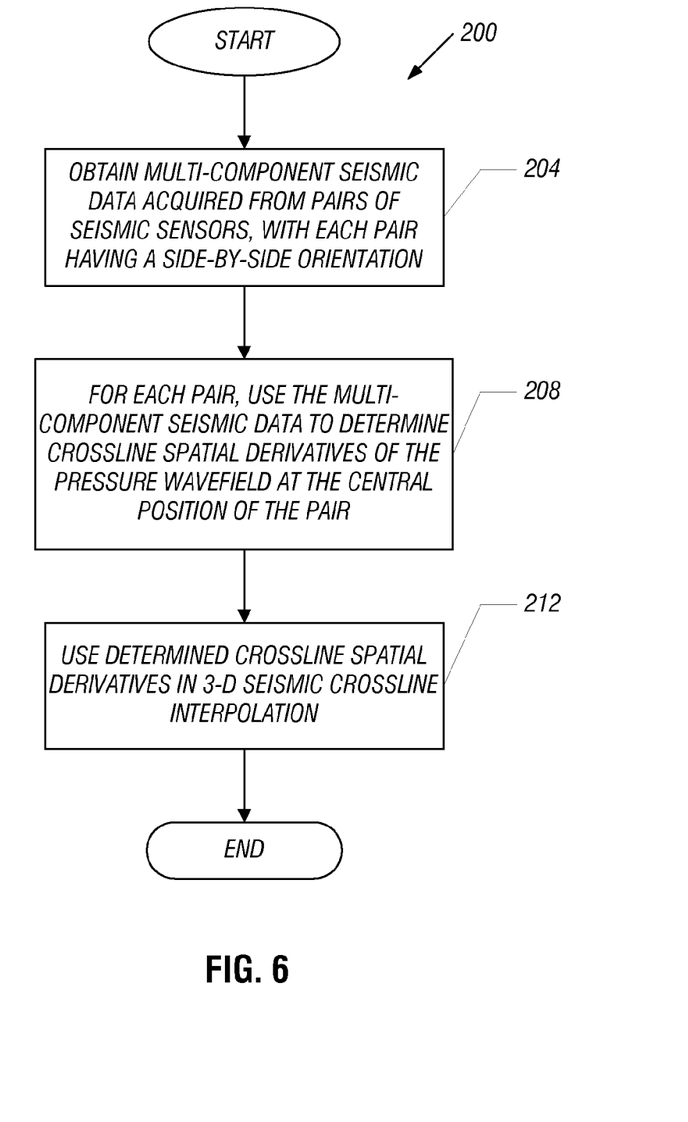

Thus, in accordance with some embodiments of the invention, a technique 200 that is depicted in FIG. 6 may be used. Pursuant to the technique 200, multi-component seismic data that is acquired from pairs of seismic sensors is obtained (block 204). Each pair has a side-by-side orientation. For each pair, the multi-component seismic data is used (block 208) to determine the crossline spatial derivatives at the pressure wavefield at the central position of each pair. The determined crossline spatial derivatives may be used, pursuant to block 212, in a 3-D crossline interpolation application.

To summarize, using the techniques described herein, for the over/under sensor orientation, second order crossline derivatives may be calculated at each sensor position. Additionally, for the over/under sensor orientation, first, second and third order (as examples) vertical derivatives may be calculated at the central position between the two sensors. In accordance with the techniques described herein, derivatives may also be calculated using the side-by-side sensor orientation as follows. Second order vertical derivatives may be calculated at each sensor position. Additionally, first, second and third order crossline derivatives may be calculated at the central position between the two sensors. It is noted that derivatives having a higher order than three (fourth order, fifth order, etc.) may be calculated using the techniques that are described herein in accordance with embodiments of the invention.

Referring to FIG. 7, in accordance with some embodiments of the invention, a seismic data processing system 320 may perform the techniques disclosed herein for determining high order spatial derivatives of the pressure wavefield. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the techniques 100, 150 and/or 200, as indicated by reference numeral 348. The memory 340 may store program instructions 344, which when executed by the processor 350, may cause the processor 350 to perform one or more of the techniques that are disclosed herein, such as the techniques 100, 150 and/or 200, as examples.

There are many different ways in which a derivative can be computed. In particular, any derivative computation can be cast as (spatial) filtering operation involving two or more closely separated sensors (as described herein with at least one of the sensors being a multi-component sensor). The coefficients of such a filtering operation may vary according to both the order and the accuracy of the derivative being computed (as described herein). Furthermore the coefficients of such a filter to compute a derivative may be adapted when the spacing between the sensors is irregular. These filtering approaches, and other embodiments are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    obtaining first multi-component seismic data acquired by at least one seismic sensor of a first seismic streamer while in tow and second multi-component seismic data acquired by at least one seismic sensor of a second seismic streamer while in tow, the first and second multi-component data being indicative of a pressure wavefield and a particle motion;
    modeling a spatial derivative of the pressure wavefield as a function of at least the first multi-component seismic data and the second multi-component seismic data; and
    based at least in part on the modeling and the first and second multi-component seismic data, determining the spatial derivative of the pressure wavefield, the spatial derivative having an order of at least two.

2. The method of claim 1, wherein the at least one seismic sensor of the first streamer and the at least one seismic sensor of the second streamer are arranged in an over/under orientation.

3. The method of claim 1, wherein the at least one seismic sensor of the first streamer and the at least one seismic sensor of the second streamer are arranged in a side-by-side orientation.

4. The method of claim 1, further comprising determining additional spatial derivatives based at least in part on the first and second multi-component seismic data,
    wherein the modeled spatial derivative and the additional spatial derivatives comprise spatial derivatives of first, second, and third order at a position between the first and second streamers.

5. The method of claim 4, wherein the spatial derivatives of the first, second and third order comprise vertical spatial derivatives.

6. The method of claim 4, wherein the spatial derivatives of the first, second and third order comprise horizontal spatial derivatives.

7. The method of claim 1, wherein the at least one seismic sensor of the first seismic streamer and the at least one seismic sensor of the second seismic streamer are arranged in an over/under orientation, and the spatial derivative comprises a vertical derivative at a position between the first and second streamers, the method further comprising determining at least one second order crossline derivative at the position based at least in part on the first and second multi-component seismic data.

8. The method of claim 1, wherein the at least one seismic sensor of the first seismic streamer and the at least one seismic sensor of the second seismic streamer are arranged in a side-by-side orientation, and the spatial derivative comprises a crossline derivative at a position between the first and second seismic streamer, the method further comprising determining at least one second order vertical derivative at the position based at least in part on the first and second multi-component seismic data.

9. The method of claim 1, further comprising:
    using the spatial derivative in processing the seismic data.

10. The method of claim 9, wherein the act of using comprises using the spatial derivative in a deghosting application.

11. The method of claim 9, wherein the act of using comprises using the spatial derivative in a crossline interpolation application.

12. A system comprising:
    an interface to receive first multi-component seismic data acquired by at least one seismic sensor of a first streamer while in tow and second multi-component seismic data acquired by at least one seismic sensor of a second seismic streamer while in tow, the first and second multi-component seismic data being indicative of a pressure wavefield and a particle motion; and
    a processor to:
        model a spatial derivative of the pressure wavefield as a function of at least the first multi-component seismic data and the second multi-component seismic data; and
        based at least in part on the modeling and the first and second multi-component seismic data, determine the spatial derivative of the pressure wavefield, the spatial derivative having an order of at least two.

13. The system of claim 12, wherein the at least one seismic sensor of the first streamer and the at least one seismic sensor of the second streamer are arranged in an over/under orientation.

14. The system of claim 12, wherein the at least one seismic sensor of the first streamer and the at least one seismic sensor of the second streamer are arranged in a side-by-side orientation.

15. The system of claim 12, wherein the processor determines the spatial derivative at a position between the first and second streamers.

16. The system of claim 15, wherein the spatial derivative comprises a vertical spatial derivative.

17. The system of claim 15, wherein the spatial derivative comprises a crossline spatial derivative.

18. The system of claim 12, further comprising:
    a vessel to tow the first and second streamers.

19. The system of claim 12, wherein the processor is located on one of the first and second streamers.

20. The system of claim 12, wherein the processor is located on a vessel that tows at least one of the first and second seismic streamers.

21. An article comprising a computer accessible storage medium storing instructions that when executed cause a processor-based system to:
- obtain first multi-component seismic data acquired by at least one seismic sensor of a first seismic streamer while in tow and second multi-component seismic data acquired by at least one seismic sensor of a second seismic streamer while in tow, the first and second multi-component seismic data being indicative of a pressure wavefield and a particle motion;
- model a spatial derivative of the pressure wavefield as a function of at least the first multi-component seismic data and the second multi-component seismic data; and
- based at least in part on the modeling and the first and second multi-component seismic data, determine the spatial derivative of the pressure wavefield, the spatial derivative having an order of at least two.

22. The article of claim 21, wherein the at least one seismic sensor of the first streamer and the at least one seismic sensor of the second streamer are arranged in an over/under orientation.

23. The article of claim 21, wherein the at least one seismic sensor of the first streamer and the at least one seismic sensor of the second streamer are arranged in a side-by-side orientation.

24. The article of claim 21, wherein the spatial derivative comprises a spatial derivative at a position between the first and second seismic streamers.

* * * * *